(12) United States Patent
Sakakibara et al.

(10) Patent No.: US 8,346,603 B2
(45) Date of Patent: Jan. 1, 2013

(54) ECOLOGICAL-POINT MANAGEMENT SYSTEM (75) Inventors: Katsumi Sakakibara, Seto (JP); Yukio Okamura, Nagoya (JP); Kenji Mori, Nishikamo-gun (JP); Yutaka Matsumoto, Toyota (JP); Chitose Shibata, Nishikamo-gun (JP); Yoshitaka Asakura, Toyohashi (JP); Akihiko Kido, Toyota (JP); Tetsuhiro Ishikawa, Nishikamo-gun (JP); Hiroyuki Yamada, Nagoya (JP); Kiichi Iwasaki, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 221 days.

(21) Appl. No.: 12/292,109

(22) Filed: Nov. 12, 2008

(65) Prior Publication Data

US 2009/0144149 A1  Jun. 4, 2009

(30) Foreign Application Priority Data

Nov. 29, 2007  (JP) ................................ 2007-309088

(51) Int. Cl.
*G06Q 30/00*    (2012.01)
*G05B 19/418*   (2006.01)

(52) U.S. Cl. .................. 705/14.27; 702/182; 701/22

(58) Field of Classification Search .................. 702/182; 701/22
See application file for complete search history.

(56) References Cited

U.S. PATENT DOCUMENTS

| | | | | |
|---|---|---|---|---|
| 6,181,991 B1 * | 1/2001 | Kondo et al. | ................... | 701/22 |
| 7,130,766 B2 * | 10/2006 | Tanase | .................. | 702/182 |
| 2003/0233201 A1 * | 12/2003 | Horst et al. | ..................... | 702/62 |
| 2005/0021191 A1 | 1/2005 | Taniguchi et al. | | |
| 2005/0143876 A1 | 6/2005 | Tanase | | |
| 2008/0039979 A1 * | 2/2008 | Bridges et al. | ............... | 700/292 |
| 2008/0039989 A1 * | 2/2008 | Pollack et al. | .................. | 701/22 |
| 2009/0091439 A1 | 4/2009 | Sekiyama et al. | | |

FOREIGN PATENT DOCUMENTS

| | | |
|---|---|---|
| JP | A-2001-078304 | 3/2001 |
| JP | A-2002-215751 | 8/2002 |
| JP | A-2003-284244 | 10/2003 |
| JP | A-2004-030454 | 1/2004 |
| JP | A-2004-48900 | 2/2004 |
| JP | A-2005-16443 | 1/2005 |
| JP | A-2005-30369 | 2/2005 |
| JP | A-2007-293626 | 11/2007 |

OTHER PUBLICATIONS

-"Hybrid tech". Automotive Industries v. 179 No. 12 (Dec. 1999) p. 28-32+ 1999. Brooke, Lindsay.*

* cited by examiner

*Primary Examiner* — Victoria Vanderhorst
(74) *Attorney, Agent, or Firm* — Oliff & Berridge, PLC (57) ABSTRACT

An ecological-point management system includes an electric powered vehicle, a charging facility, a communication network, a management server, point recipients each having a device capable of accessing the communication network. The electric storage device of the electric powered vehicle is configured to be chargeable by the charging facility. In the ecological-point management system, an ecological point in accordance with an amount of greenhouse gas emission that can be reduced by traveling using electric power by the electric powered vehicle is given to the point recipients. The point recipients can include an owner or a driver of the electric powered vehicle, and a manufacture, an installation personnel, an owner of the charging facility, and an owner of an installation place, and further a provider of the charging power.

16 Claims, 7 Drawing Sheets

| POINT RECIPIENT \ CHARGING FACILITY | CHARGING STAND (HOUSING, PARKING AREA, ETC.) | VENDING MACHINE (WITH CHARGING FACILITY ATTACHED) |
|---|---|---|
| CHARGING STAND MAKER/OWNER | ○ | — |
| VENDING MACHINE MAKER/OWNER | — | ○ |
| INSTALLATION PLACE OWNER | ○ | ○ |
| ELECTRIC POWER COMPANY (WHEN SYSTEM POWER IS USED) | △ | △ |
| ELECTRICITY GENERATING FACILITY MAKER/OWNER(CLEAN POWER SOURCE) | △ | △ |
| POINT USE SITE | △ | △ |

ECOLOGICAL-POINT MANAGEMENT SYSTEM

This nonprovisional application is based on Japanese Patent Application No. 2007-309088 filed on Nov. 29, 2007 with the Japan Patent Office, the entire contents of which are hereby incorporated by reference.

BACKGROUND OF THE INVENTION

1. Field of the Invention

This invention relates to an ecological-point management system, and more specifically to an ecological-point management system for operating a point given in accordance with an amount of greenhouse gas emission that can be reduced by traveling using electric power by an electric powered vehicle configured to be chargeable by an external charging facility.

2. Description of the Background Art

In recent years, as an eco-friendly vehicle, attentions have been attracted to an electric powered vehicle, such as an electric automobile, a hybrid car, a fuel-cell car and the like, which carries an electric storage device typified by a secondary battery, and as a driving device, has a motor configured so that driving force can be generated by electric power from the electric storage device.

Particularly, with the electric powered vehicle, by constructing the electric storage device such that it can be charged by a electric power source outside the vehicle (hereinafter, also referred to as "external electric power source") during parking, above all, by performing the charge by the external electric power source using midnight power, contribution to control of total traveling cost, and reduction in an amount of greenhouse gas (particularly $CO_2$) emission has been expected. Hereinafter, the charge of the electric storage device by the external electric power source is also referred to simply as "external charge"

In view of recently increased social interest in environmental problems including the adoption of Kyoto Protocol, popularization and expanded use of the electric powered vehicle having a high reduction effect of greenhouse gas emission have high social significance. Therefore, the motivation to use the electric powered vehicle is expected to be enhanced.

In light of the foregoing, Japanese Patent Laying-Open No. 2001-78304 (Patent Document 1) discloses an environmental-contribution-degree presenting device that quantitatively displays an amount of gas emission that can be reduced by utilizing an electric automobile. Patent Document 1 describes the effect that a $CO_2$ reduction amount resulting from traveling of the electric automobile is calculated based on a traveling distance, and that the reduction is displayed in a pattern of tree growth or the like, corresponding to a cumulative value of an ecological point computed by multiplying the $CO_2$ reduction amount by a coefficient.

Moreover, as a related art of the present invention, an ecological management system in which a point (ecological point) is given in the purchase of environment-friendly goods is disclosed in Japanese Patent Laying-Open No. 2002-215751 (Patent Document 2). Moreover, a general point operating system utilizing a communication network is disclosed in Japanese Patent Laying-Open No. 2004-30454 (Patent Document 3).

However, in the environmental-contribution degree presenting device disclosed in Patent Document 1, the amount of reduction in greenhouse gas emission is displayed so as to be grasped quantitatively, which merely psychologically encourages a driver. Thus, it is difficult to increase the motivation for reduction in greenhouse gas emission by the popularization and expanded use of the electric powered vehicle in the whole society.

Moreover, in the popularization of the electric powered vehicle, development of infrastructure typified by a charging facility for external charge holds the key. Accordingly, the establishment of a system that can provide motivation for installation of the facility not only to an owner and a driver of the electric powered vehicle but also to a provider of the above-described infrastructure is desired.

SUMMARY OF THE INVENTION

This invention has been achieved in order to solve the above-described problems, and an object of this invention is to establish a system that appropriately gives a point (ecological point) for quantitatively evaluating an environmental contribution degree through the use of an electric powered vehicle, thereby contributing to enhancement throughout the whole society in motivation for reduction in greenhouse gas emission by popularization and expanded use of an electric powered vehicle.

This invention is an ecological-point management system for operating a point given in accordance with an amount of greenhouse gas emission that can be reduced by traveling using electric power by an electric powered vehicle configured to be chargeable by a charging facility outside the electric powered vehicle, including a transmission unit, a point calculation unit, a management unit, and a storage unit. The transmission unit transmits calculation information including at least one of information of traveling using electric power from an electric storage device mounted on the electric powered vehicle, and information of charge of the electric storage device by the charging facility together with identification information of the electric powered vehicle and the charging facility that charges the electric storage device. The point calculation unit calculates the ecological point to be given, based on the calculation information transmitted from the transmission unit. The management unit gives the ecological point calculated by the point calculation unit to a point destination associated with at least one of the electric powered vehicle and the charging facility in advance, based on the identification information transmitted from the transmission unit. The storage unit is provided on a basis of the point destination and stores the ecological point given by the management unit.

Preferably, the point destination includes an owner of the electric powered vehicle. Alternatively, the point destination includes an electric power supplier to the charging facility.

Preferably, the point destination includes at least one of a manufacturer, an installation personnel, and an owner of the charging facility. Alternatively, the point destination includes an owner of an installation place of the charging facility.

Alternatively, preferably, the ecological-point management system further includes a request unit that generates a calculation request of the ecological point. The transmission unit transmits the calculation information and the identification information to the point calculation unit in response to the calculation request.

According to the ecological-point management system, the ecological point in accordance with the amount of reduction in greenhouse gas emission can be given to not only the owner of the electric powered vehicle but also to a contributor relating to the external charge, and can be managed, based on the identification information of the electric powered vehicle and the charging facility. As a result, motivation for reduction in greenhouse gas emission by popularization and expanded use of the electric powered vehicle can also be provided to other than the owner of the electric powered vehicle.

More preferably, the request unit automatically generates the calculation request when driving of the electric powered vehicle ends. Alternatively, the request unit automatically generates the calculation request in response to a lapse of a predetermined time Moreover, more preferably, the ecological-point management system further includes an input unit that receives the calculation request operated manually. The request unit generates the calculation request in response to operation of the input unit.

These enables system operation in which the ecological point can be generated in accordance with the request from the electric powered vehicle side, and the ecological point can be given to the contributor relating to the external charge.

More preferably, the request unit automatically generates the calculation request at the time of charge of the electric storage device by the charging facility.

This enables system operation in which the ecological point can be automatically generated at the time of the external charge of the electric powered vehicle by the charging facility, and the ecological point can be given to the contributor relating to the external charge.

Moreover, preferably, the point calculation unit reflects an amount of charging power at the time of charge of the electric storage device by the charging facility to calculate the ecological point. Alternatively, the point calculation unit reflects information of the charging power of the electric storage device by the charging facility to calculate the ecological point.

This enables system operation in which the ecological point can be given in accordance with contents of the external charge of the electric powered vehicle by the charging facility.

Accordingly, according to the ecological-point management system of the invention, a system can be established that by appropriating giving the point (ecological point) for quantitatively evaluating an environmental contribution degree through the use of the electric powered vehicle, can contribute to increase in motivation for reduction in greenhouse gas emission by popularization and expanded use of the electric powered vehicle, in the whole society.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Hereinafter, referring to the drawings, an embodiment of the present invention is described in detail. Hereinafter, the same or equivalent parts in the drawings are given the same reference numerals and signs, and in principle, description thereof is not repeated.

Figure 1:
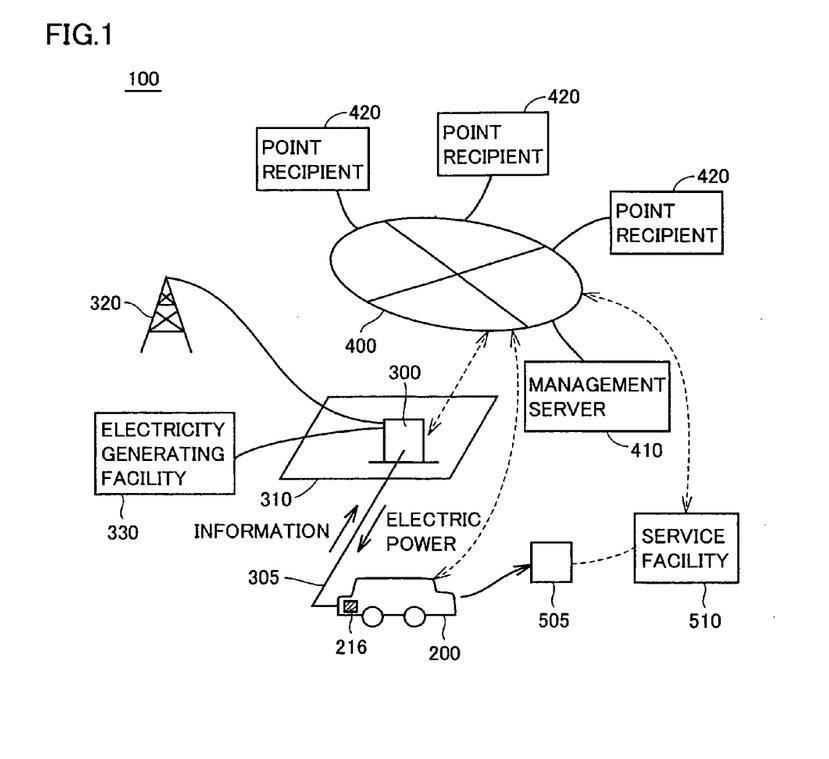
FIG. 1 is a schematic block diagram showing a configuration example of an ecological-point management system according to an embodiment of the present invention.

FIG. 1 is a schematic block diagram showing a configuration example of an ecological-point management system according to the embodiment of the present invention.

Referring to FIG. 1, an ecological-point management system 100 according to the embodiment of the present invention includes an electric powered vehicle 200, a charging facility 300, a communication network 400 configured in a wired manner or a wireless manner, a management server 410, and point recipients 420 each having a device that can access communication network 400.

Electric powered vehicle 200 includes an electric storage device 216. Electric storage device 216 is configured to be externally charged by being electrically connected to charging facility 300 provided outside the vehicle through a feeder cable 305. At the time of external charge, information can be transmitted and received bi-directionally between electric powered vehicle 200 and charging facility 300 by power line communication or communication through a communication cable integrated with feeder cable 305, or the like.

As charging power at the time of external charge, charging facility 300 uses system electric power from a system electric power source 320 of an electric power company and electric power from an electricity generating facility 330 of so-called clean energy such as solar light, wind power and the like. At the time of the external charge, authentication processing for precisely recognizing electric powered vehicle 200 to be charged is executed, and when the authentication processing is completed normally, the charging power for charging the electric storage device is supplied from charging facility 300 to electric powered vehicle 200.

Furthermore, charging facility 300 is configured so as to transmit and receive information bi-directionally with respect to management server 410 through communication network 400. Also, communication between electric powered vehicle 200 and communication network 400 is enabled by a vehicle communication function such as a G-BOOK (registered trademark) and the like. Moreover, communication network 400 can also be accessed by a portable telephone of an owner of the electric powered vehicle or the like.

As described later in detail, ecological-point management system 100 gives an ecological point in accordance with an amount of greenhouse gas (e.g., $CO_2$) emission that can be reduced by traveling using electric power by electric powered vehicle 200 to point recipients 420. Point recipients 420 can receive the ecological point by access to communication network 400. Point recipients 420 include at least the owner of electric powered vehicle 200. Each of point recipients 420 can transmit and receive information bi-directionally with respect to management server 410, charging facility 300 or electric powered vehicle 200.

The ecological point is preferably managed uniformly by management server 410, and the given ecological point is finally transmitted to each of point recipients 420. The ecological point given to the owner of electric powered vehicle 200 can be managed using a storage device (not shown) inside electric powered vehicle 200.

Furthermore, the ecological point can be recorded electronically or magnetically on a medium 505 that can be taken out of the vehicle. For example, cards or portable equipment can be used as medium 505.

For example, the ecological point given to the owner of electric powered vehicle 200 can be operated so that it can be used as electronic money, or a point for receiving some special benefit in a service facility 510. Service facility 510 includes a commercial facility such as a store, and an amusement facility such as a movie theater, for example. The ecological point of point recipients 420 can be managed so that the access of service facility 510 to communication network 400, or the access to medium 505 allows the used ecological point to be subtracted. In this manner, by the operation of the ecological point enabling a direct benefit to be gained, at least the owner of electric powered vehicle 200 can be highly motivated for reduction in greenhouse gas emission by popularization and expanded use of the electric powered vehicle.

Furthermore, in ecological-point management system 100, point recipients 420 of the ecological point other than the owner of electric powered vehicle 200 can be spread. Therefore, in order to precisely specify point recipients 420, not only electric powered vehicle 200 but also charging facility 300 that performed the external charge need to be precisely identified.

As described above, at least at the time of external charge, identification information of electric powered vehicle 200 and identification information of charging facility 300 can be transmitted to communication network 400. At this time, information of an owner of an installation place 310 of charging facility 300 can also be transmitted to communication network 400 in association with the identification information of charging facility 300.

Furthermore, information for identifying a supply source of the charging power by charging facility 300, that is, an electric power company that generated system electric power, a manufacturer, an installation personnel, an owner or the like of electricity generating facility 330 that generated the clean energy can be transmitted in association with the identification information of charging facility 300.

These types of identification information of the external charge can also be transmitted to electric powered vehicle 200 at the time of the external charge. Accordingly, the identification information can be temporarily stored in electric powered vehicle 200, and then, can be transmitted to communication network 400 from electric powered vehicle 200 side on an occasion different from the external charge.

Charging facility 300 is typically a charging device (charging stand) exclusively for electric powered vehicle 200, and is provided in a parking space of an individual residence, a parking area of collective housing, a month-to-month or temporary parking area, or a parking area of a business enterprise, a commercial facility, an amusement facility, a public facility or the like. Alternatively, charging facility 300 may be arranged in an aspect in which it is attached to a vending machine.

Figure 2:
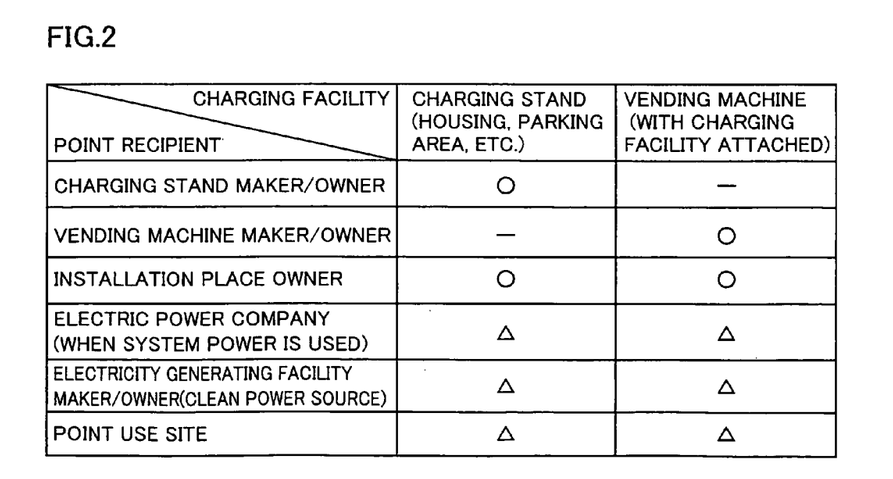
FIG. 2 is a diagram showing a table exemplifying correspondence relations between types of a charging facility and point recipients.

In FIG. 2, correspondence relations between types of the charging facility and point recipients are illustrated.

Referring to FIG. 2, in a case where charging facility 300 is a charging stand arranged in housing, a parking area or the like, besides the owner of electric powered vehicle 200, a manufacturer (maker) and an owner of the charging stand, or in addition, an installation personnel of the charging stand can be included in point recipients 420. Furthermore, an owner of the installation place of the charging stand can also be included in point recipients 420.

Similarly, when charging facility 300 is attached to a vending machine, a manufacturer (maker) and an owner of the vending machine, or in addition, an installation personnel of the vending machine can also be included in point recipients 420. Furthermore, an owner of an installation place of the vending machine can also be included in point recipients 420.

Moreover, point recipients 420 can be expanded in accordance with the type of the charging power by charging facility 300. For example, when charging facility 300 externally charges electric powered vehicle 200 using electric power from system electric power source 320, an electric power company thereof can be included in point recipients 420. Similarly, when charging facility 300 externally charges electric powered vehicle 200 using electric power from electricity generating facility 330 by clean energy, a manufacturer (maker), an installation personnel, and an owner of electricity generating facility 330, and an owner of an installation place thereof can be included in point recipients 420.

Furthermore, when the operation is such that each of point recipients 420 uses the accumulated ecological point at service facility 510 and the like, the ecological point may be given to the use site of the ecological point.

Thus, according to the ecological-point management system of the embodiment of the present invention, the ecological point in accordance with the amount of greenhouse gas ($CO_2$) emission reduced resulting from the electric power traveling by electric powered vehicle 200 can be widely given not only to the owner and the driver of the electric powered vehicle but also to the contributors including the providers of the infrastructure for the external charge and the cooperators thereof. As a result, the motivation for reduction in greenhouse gas emission by popularization and expanded use of the electric powered vehicle can be widely yielded in the whole society.

Hereinafter, details of respective components of the system shown in FIG. 1 are described. First, a configuration for quantitative evaluation of reduction in greenhouse gas emission resulting from the traveling using the configuration and the electric power of electric powered vehicle 200 is described.

Figure 3:
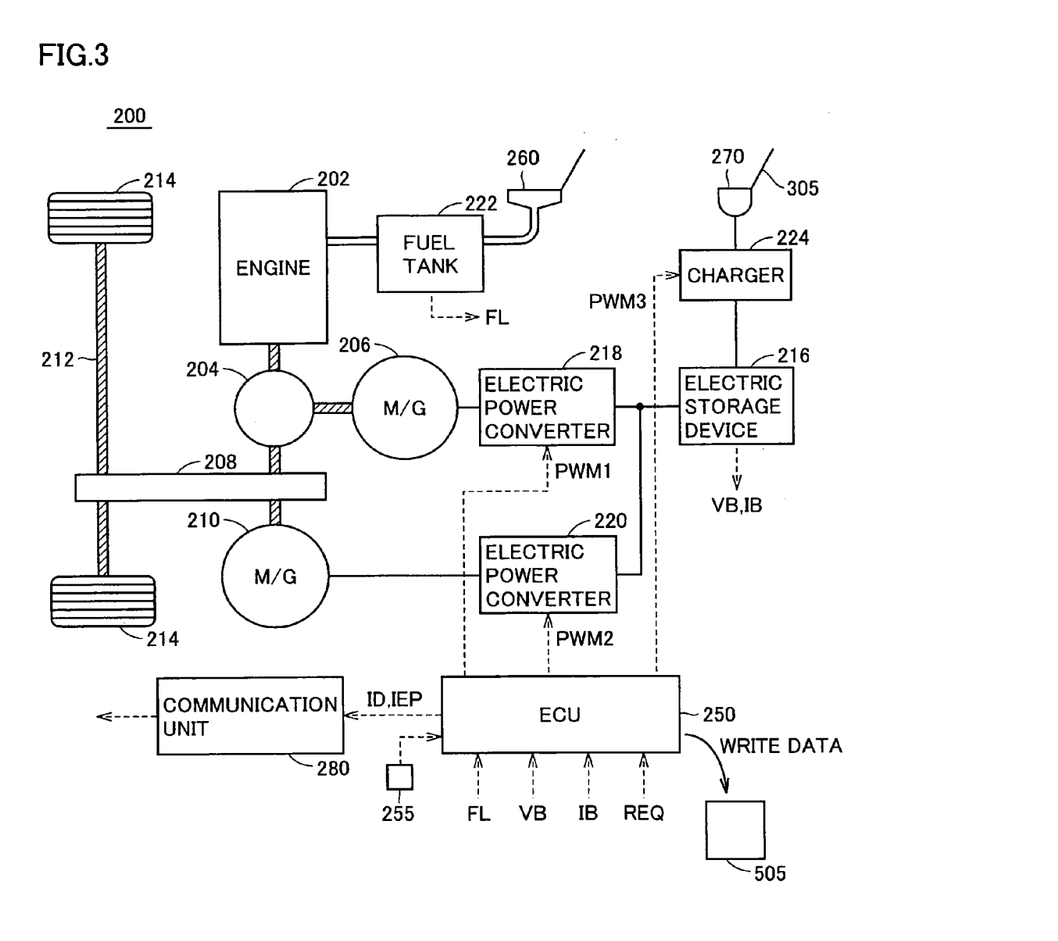
FIG. 3 is a functional block diagram for describing a configuration example of the electric powered vehicle.

FIG. 3 is a functional block diagram for describing a configuration example of electric powered vehicle 200 shown in FIG. 1. While in FIG. 3, an example where electric powered vehicle 200 is a hybrid car is described, electric powered vehicle 200 includes a concept containing a vehicle configured to be capable of traveling using electric power externally charged, such as a hybrid car, an electric automobile, a fuel automobile and the like, each of which has a different configuration from that of FIG. 3.

Referring to FIG. 3, electric powered vehicle 200 includes an engine 202, a power split mechanism 204, motor generators 206, 210, a transmission gear 208, a driving shaft 212, and wheels 214. Electric powered vehicle 200 further includes electric storage device 216, electric power converters 218, 220, a fuel tank 222, a fuel compensating port 260, a charger 224, an ECU (Electronic Control Unit) 250, a charging connector 270 and a communication unit 280.

Power split mechanism 204 is coupled to engine 202, motor generator 206, and transmission gear 208 to split power among them. For example, a planetary gear having three rotary shafts of a sun gear, a planetary carrier, and a ring gear can be used as power split mechanism 204, and these three rotary shafts are connected to rotary shafts of engine 202, motor generator 206, and transmission gear 208, respectively.

Kinetic energy created by engine 202 is distributed between motor generator 206 and transmission gear 208 by power split mechanism 204. That is, engine 202 is incorporated in electric powered vehicle 200 as a power source that drives transmission gear 208 transmitting the power to driving shaft 212, and also drives motor generator 206. Motor generator 206 is incorporated in electric powered vehicle 200 as a component that operates as a motor driven by engine 202, and that operates as a motor capable of starting engine 202. Moreover, motor generator 210 is incorporated in electric powered vehicle 200 as a power source driving transmission gear 208 that transmits the power to driving shaft 212.

Electric storage device 216 is a chargeable/dischargeable DC power source, and is made of a secondary battery of nickel hydrogen, lithium ion and the like, for example. Electric storage device 216 supplies electric power to electric power converters 218, 220. Moreover, electric storage device 216, at the time of electricity generation of motor generator(s) 206 and/or 210, receives electric power from electric power converter(s) 218 and/or 220 to be charged.

Furthermore, at the time of the external charge when charging connector 270 is connected to charging facility 300 (FIG. 1) through feeder cable 305, electric storage device 216 is charged by receiving electric power from charger 224, which converts electric power from charging facility 300 to the charging power of electric storage device 216.

As electric storage device 216, a large-capacitance capacitor can also be employed, and any device may be employed as long as it is an electric power buffer that can temporarily store the generated electric power by motor generators 206, 210 and the electric power from the external electric power source, and can supply the stored electric power to motor generators 206, 210. An output voltage VB and an input/output current 11B of electric storage device 216 are detected by a sensor not shown, and detected values thereof are sent out to ECU 250.

Electric power converter 218 converts the electric power generated by motor generator 206 to DC power based on a signal PWM1 from ECU 250 to output to electric storage device 216. Electric power converter 220 converts DC power supplied from electric storage device 216 to AC power based on a signal PWM2 from ECU 250 to output to motor generator 210. When engine 202 is started, electric power converter 218 converts DC power supplied from electric storage device 216 to AC power based on signal PWM1 to output to motor generator 206. Moreover, when acceleration of the vehicle is reduced at braking time or on a down slope, electric power converter 220 converts electric power generated by motor generator 210 to DC power based on signal PWM2 to output to electric storage device 216.

Motor generators 206, 210 are AC motors, and are each made of, for example, a three-phase AC synchronous motor in which a permanent magnet is buried in a rotor. Motor generator 206 converts kinetic energy generated by engine 202 to electric energy to output to electric power converter 218. Moreover, motor generator 206 creates driving force by three-phase AC power received from electric power converter 218 to start engine 202.

Motor generator 210 creates driving torque of the vehicle by three-phase AC power received from electric power converter 220. Moreover, when acceleration of the vehicle is reduced at braking time or on a down slope, motor generator 210 converts dynamical energy stored in the vehicle as kinetic energy and potential energy to electric energy to output to electric power converter 220.

Engine 202 converts thermal energy by combustion of a fuel to kinetic energy of moving elements such as a piston, a rotor and the like, and the converted kinetic energy outputs power split mechanism 204. For example, if the moving element is a piston, and the motion is a reciprocating motion, the reciprocating motion is converted to rotary motion through a so-called crank mechanism, and the kinetic energy of the piston is transmitted to power split mechanism 204. As a fuel of engine 202, a hydrocarbon-based fuel such as gasoline, light oil, ethanol, liquid hydrogen, and natural gas, or a liquid or gas hydrogen fuel is preferable.

Fuel tank 222 stores the fuel from supplied fuel compensating port 260, and supplies the stored fuel to engine 202. A fuel remaining amount FL inside fuel tank 222 is detected by a sensor not shown, and the detected value is outputted to ECU 250. Charger 224 converts electric power from the external electric power source provided to charging connector 270 to the charging power of electric storage device 216 based on a signal PWM3 from ECU 250 to output to electric storage device 216.

ECU 250 generates signals PWM1, PWM2 for driving electric power converters 218, 220, and outputs generated signals PWM1, PWM2 to electric power converters 218, 220, respectively. Moreover, upon receiving a signal REQ requesting the charge of electric storage device 216 by charger 224, ECU 250 generates signal PWM3 for driving charger 224, and outputs generated signal PWM3 to charger 224.

The configuration for the external charge of electric powered vehicle 200 is not limited to the example in FIG. 3, but any configuration can be applied as long as it can convert the electric power from charging facility 300 to the charging power of electric storage device 216 during parking. For example, a configuration may be such that the arrangement of charger 224 exclusively for the external charge is omitted, and the electric power from the external electric power source provided to charging connector 270 is converted to the charging power of electric storage device 216 by electric power converters 218, 220.

Furthermore, ECU 250 controls a traveling mode of electric powered vehicle 200. That is, ECU 250 controls the switching between traveling by stopping engine 202 to use only motor generator 210 (motor traveling mode) and traveling by operating engine 202 (hybrid traveling mode) (hereinafter, the motor traveling mode is also referred to "EV mode", and the hybrid traveling mode is also referred to as "HV mode".

Furthermore, ECU 250 outputs ecological-point information IEP for quantitatively evaluating an amount of reduction in greenhouse gas emission resulting from the traveling using the electric power, based on fuel remaining amount FL of fuel tank 222 and respective detection values of voltage VB and current IB of electric storage device 216, or another information not shown. Furthermore, identification information ID for specifying at least electric powered vehicle 200 is also outputted.

Ecological-point information IEP and identification information ID outputted from ECU 250 is transmitted outside electric powered vehicle 200 by communication unit 280.

When authentication information is transmitted at the time of external charge, information for specifying charging facility 300 is added to identification information ID. When identification information ID is outputted on an occasion different from the external charge, the identification information of charging facility 300 stored inside the vehicle at the time of external charge is included in identification information ID outputted from electric powered vehicle 200.

Communication unit 280 corresponds to communication equipment or a vehicle communication function facility such as G-BOOK (registered trademark) for executing electric power line communication or bi-directional communication with respect to charging facility 300 through a communication cable integrated with feeder cable 305 or the like at the external charge. That is, communication unit 280 is configured to be capable of accessing charging facility 300 and/or communication network 400. Furthermore, communication unit 280 can also receive information of the ecological point generated by management server 410 and the like. Moreover, ECU 250 can record the information of the ecological point on medium 505 (FIG. 1) electronically or magnetically.

Furthermore, in electric powered vehicle 200, an operation unit 255 for requesting calculation (giving) of the ecological point manually may be provided. Although operation unit 255 is typically made of touch switches and the like displayed on a touch panel, it may be provided in any aspect as long as it can be operated by the owner or the driver of electric powered vehicle 200. Moreover, as described later, the configuration can be provided such that the calculation of the ecological point can be automatically requested in response to establishment of a predetermined condition.

Figure 4:
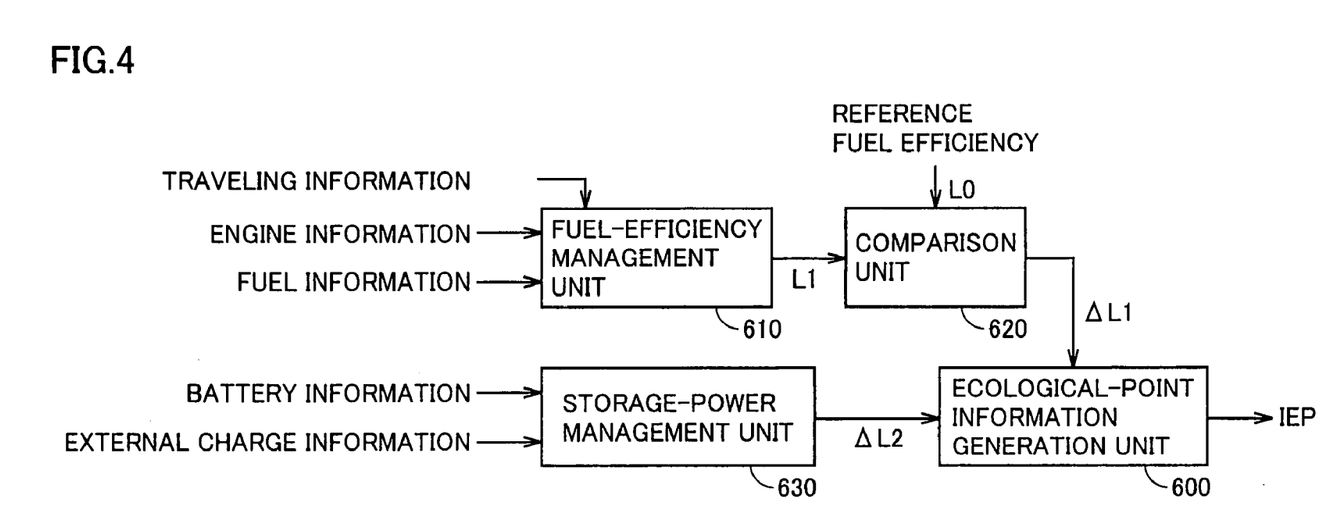
FIG. 4 is a functional block diagram showing a first example of a configuration in which ecological-point information shown in FIG. 3 is calculated.
Figure 5:
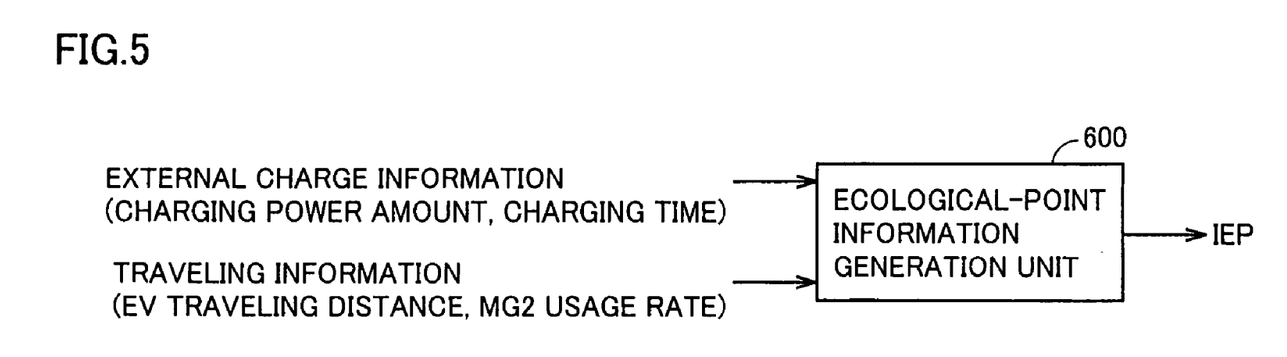
FIG. 5 is a functional block diagram showing a second example of the configuration in which the ecological-point information shown in FIG. 3 is calculated.

Next, a functional configuration of ECU 250 for calculating the above-described ecological-point information IEP is described using block diagrams of FIGS. 4 and 5. Respective functional blocks shown in FIGS. 4 and 5 are basically realized by ECU 250. However, some of the functional blocks and some of functions thereof can also be realized by an external control unit (arithmetic operation device) outside electric powered vehicle 200.

In a first example shown in FIG. 4, a fuel-efficiency management unit 610 receives engine information indicating an operation state of engine 202, fuel information indicating a use state of the fuel, and traveling information indicating information of a traveling speed and a traveling route. Based on these pieces of information, fuel-efficiency management unit 610 calculates an actual fuel efficiency L1 which is a fuel consumption amount per unit traveling distance. For example, the fuel consumption amount is managed based on a vehicle speed, and a fuel injection amount in engine 202.

A comparison unit 620 compares actual fuel efficiency L1 calculated by fuel-efficiency management unit 610, and a reference fuel efficiency L0. Reference fuel efficiency L0 indicates a fuel consumption amount per unit distance when traveling only by the output from engine 202 by combustion of the fuel (gasoline) is performed. In the calculation of reference fuel efficiency L0, information (inclination, vehicle speed and the like) of a traveling route of electric powered vehicle 200 may be reflected. Comparison unit 620 calculates an amount of reduction in greenhouse gas AL1 resulting from fuel efficiency improvement, based on a product of a fuel-efficiency improvement amount (L1-L0), which is a difference between actual fuel efficiency L1 calculated by fuel-efficiency management unit 610 and reference fuel efficiency L0, an amount of greenhouse gas emission by fuel combustion in a unit amount, and a traveling distance.

A storage-power management unit 630 manages an amount of electric power stored in electric storage device 216 and contents of the electric power, based on input/output electric power grasped from voltage VB and current IB. That is, storage-power management unit 630 can grasp an amount of electric power outputted from electric storage device 216 to be used for vehicle traveling by constantly grasping the above-described input/output electric power.

Furthermore, based on the addition of the input/output electric power in succession, storage-power management unit 630 can also grasp percentages of the electric power charged externally, and the electric power generated inside electric powered vehicle 200 (regenerative electric power and generated electric power by engine output) with respect to the whole storage power of electric storage device 216. Further, if external charge information such as the identification information of charging facility 300 is reflected at the time of external charge, with the storage power of electric storage device 216, an amount of greenhouse gas yield L# per unit electric power amount at the time of electricity generation can be calculated.

At this time, if as the external charge information, information of a type of the charging power of charging facility 300 (distinction between system electric power source/clean energy), or for the system electric power source, a charge time (midnight zone or not) is included, amount of greenhouse gas yield L# per unit electric power amount can be evaluated more minutely.

Furthermore, storage-power management unit 630 calculates an amount of greenhouse gas yield ΔL2 when the electric power used for traveling is generated, based on a product of an amount of electric power used for vehicle traveling and amount of greenhouse gas yield L# per unit amount of electric power.

An ecological-point information generation unit 600 generates ecological-point information IEP for quantitatively evaluating an amount of reduction in greenhouse gas emission based on a difference between amount of reduction in greenhouse gas AL1 resulting from fuel improvement, and amount of greenhouse gas yield AL2 resulting from the generation of the electric power used for traveling. Ecological-point information IEP may be generated as an actual achievement value resulting from the vehicle traveling, and may be generated as a coefficient ke indicating an amount of reduction in greenhouse gas emission with respect to the use of the unit amount of the electric power. For example, at the time of external charge, a predicted value of the amount of reduction in greenhouse gas emission can be calculated in accordance with a product of coefficient ke and the amount of the electric power of the external charge.

Alternatively, as shown in FIG. 5, as a simpler configuration, ecological-point information generation unit 600 may generate ecological-point information IEP based on the external charge information including an amount of charging power at the time of external charge and a charging time. At this time, information indicating which of midnight power zone and daytime power zone the charging time is in, and information indicating which of system electric power source or clean energy a supply source of the electric power charged from charging facility 300 is are included in ecological-point information IEP. These pieces of information may be directly outputted from charging facility 300 to communication network 400.

Alternatively, ecological-point information generation unit 600 may generate ecological-point information IEP based on the traveling information indicating the traveling of electric powered vehicle 200 using the electric power. At this time, ecological-point information IEP in which a distance of the traveling performed by motor generator 210 (EV traveling) and a ratio of created power of MG2 for total power output of traveling power are reflected can be generated.

In this manner, ecological-point information IEP, which is basic data for quantitatively evaluating the amount of reduction in greenhouse gas emission resulting from the traveling using the electric power, can be generated by ecological-point information generation unit 600. Ecological-point information IEP includes at least one of the traveling information of the traveling using the electric power of electric storage device 216 and the information of the external charge by charging facility 300, corresponding to "calculation information".

Output timing of ecological-point information IEP from ecological-point information generator 600 is not particularly limited, but basically, the output is executed in conformity with a calculation request of the ecological point.

Figure 6:
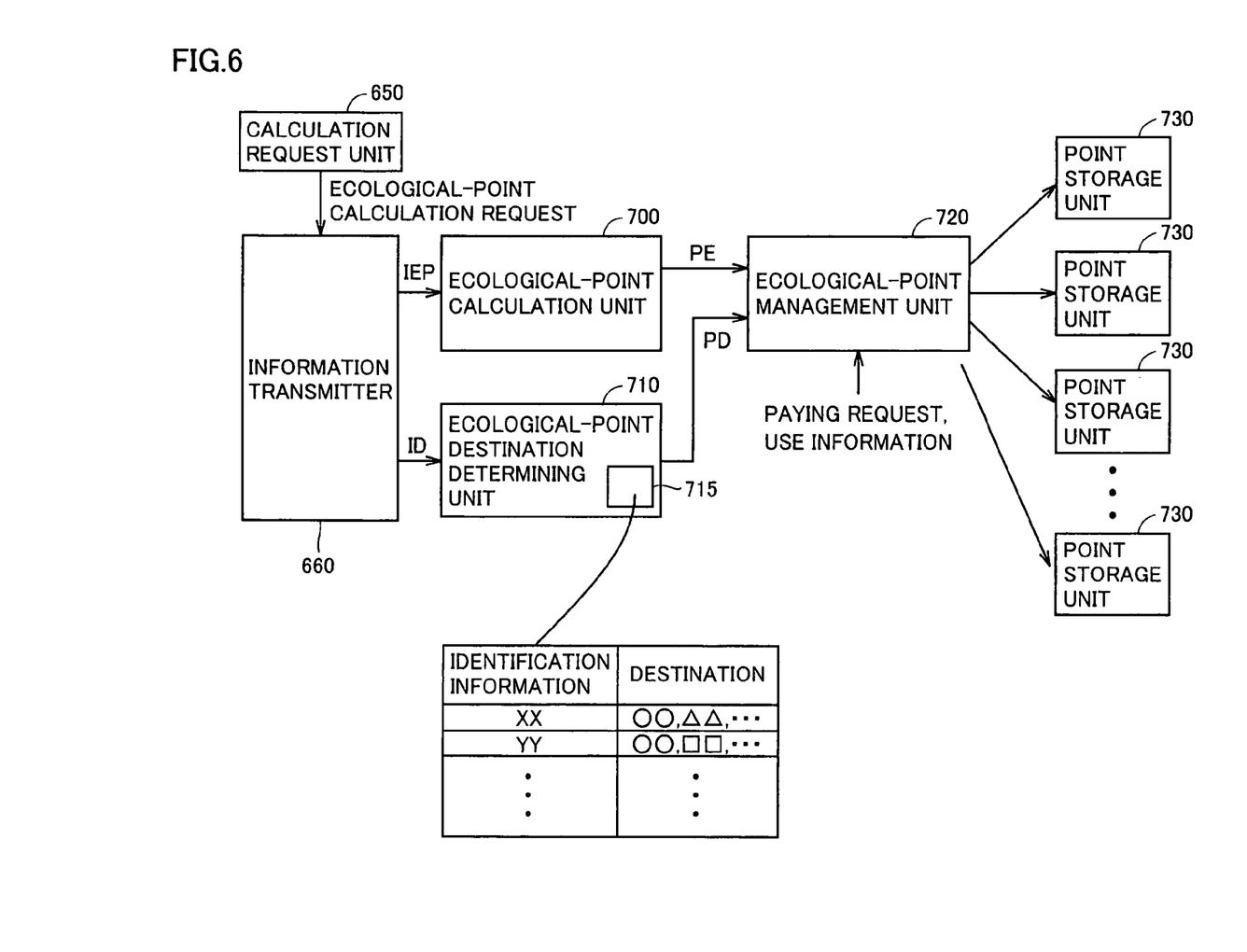
FIG. 6 is a functional block diagram for describing a configuration for giving and managing the ecological point in response to an ecological-point calculation request.

In FIG. 6, a functional block diagram for explaining a configuration for giving and managing the ecological point in response to an ecological-point calculation request is shown.

Referring to FIG. 6, a calculation request unit 650 automatically creates an ecological-point calculation request in response to manual operation of operation unit 255, or in response to execution of external charge. Alternatively, the ecological-point calculation request may be automatically created in response to driving end of electric powered vehicle 200 (ignition switch or power switch is turned off), lapse of a predetermined time, traveling a predetermined distance, or feeding into fuel tank 222.

An information transmitter 660 transmits ecological-point information IEP and identification information ID in response to the ecological-point calculation request. Identification information ID includes information for specifying electric powered vehicle 200 and charging facility 300 that performed the external charge.

An ecological-point calculation unit 700 calculates an ecological point PE based on ecological-point information IEP. As described above, ecological point PE may be calculated as an actual achievement value (estimated value) of an amount of reduction in greenhouse gas emission in accordance with actual achievement of the vehicle traveling using electric power, or may be calculated as a predicted value of an amount of reduction in greenhouse gas emission expected from future vehicle traveling using electric power in accordance with an amount of charging power charged externally. Here, as described above, the reflection of the external charge information in ecological-point information IEP allows ecological point PE to be calculated based on the information of the electric power used for the external charge including a charging time (midnight power zone/daytime power zone), and a supply source of the electric power charged from charging facility 300, and the amount of charging power.

An ecological-point destination determining unit 710 generates destination data PD indicating ecological-point destinations for specifying point recipients 420, based on identification information ID. Ecological-point destination determining unit 710 holds a table 715 that defines correspondence relations between the above-described identification information and determination data PD in advance. Ecological-point destination determining unit 710 generates destination data PD based on identification information ID sent together with ecological-point information IEP, with reference to table 715.

An ecological-point management unit 720 transmits the ecological point to a point storage unit 730 provided for each of point recipients 420, based on ecological point PE calculated by ecological-point calculation unit 700 and destination data PD determined by ecological-point destination determining unit 710. In point storage unit 730, which has received the transmission of the ecological point, the stored data indicating the number of ecological points is updated based on an addition result from the cumulative total number of points and the number of transmitted points.

Furthermore, ecological-point management unit 720 updates the above-described stored data based on a subtraction result of the number of paid or used points from the past cumulative number of points when a paying request from each of point recipients 420 is issued, or when ecological point PE is used in service facility 510 (FIG. 1) and the like. In this manner, ecological point PE is managed for each of point recipients 420.

Here, calculation request unit 650 and information transmitter 660 are realized by electric powered vehicle 200 or functions of electric powered vehicle 200 and charging facility 300. Moreover, although ecological-point calculation unit 700, ecological-point destination determining unit 710, ecological-point management unit 720, and point storage unit 730 are preferably configured in management server 410, the configuration may be such that point storage unit 730 is arranged on the side of each of point recipients 420.

Alternatively, the configuration may be such that the arrangement of management server 410 is omitted, and that respective functions of ecological-point calculation unit 700, ecological-point destination determining unit 710, ecological-point management unit 720 and point storage unit 730 are distributed and arranged on a basis of electric powered vehicle 200, charging facility 300 and some of point recipients 420.

In the configuration of FIG. 6, calculation request unit 650 corresponds to a "request unit" and information transmitter 660 corresponds to a "transmission unit". Furthermore, ecological-point calculation unit 700 corresponds to a "point calculation unit", ecological-point management unit 720 corresponds to a "management unit", and point storage unit 730 corresponds to a "storage unit".

Figure 7:
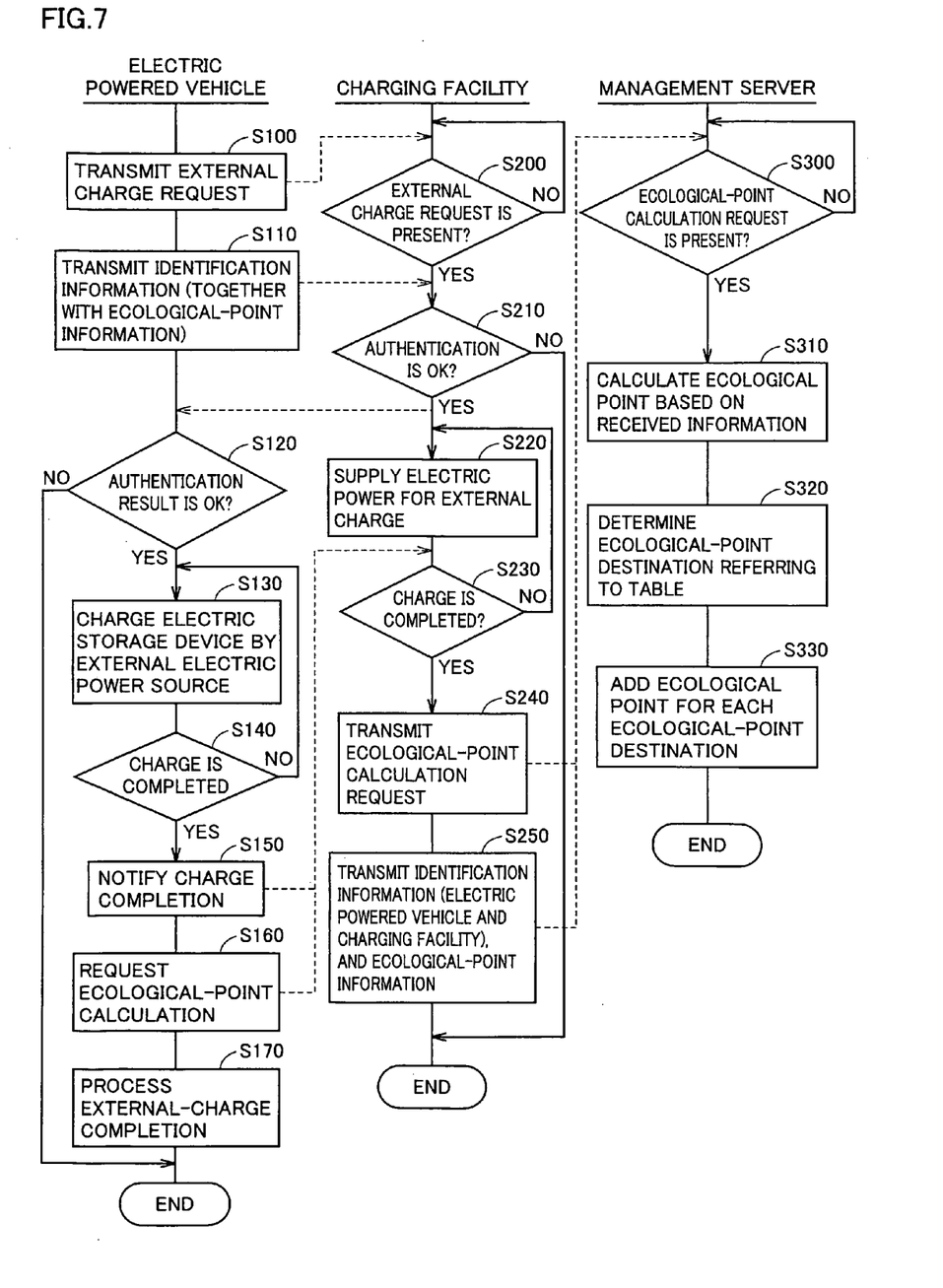
FIG. 7 is a flowchart showing a first example of a series of processing steps of creation of the ecological-point calculation request, ecological-point calculation and transmission in the ecological-point management system according to the present embodiment.
Figure 8:
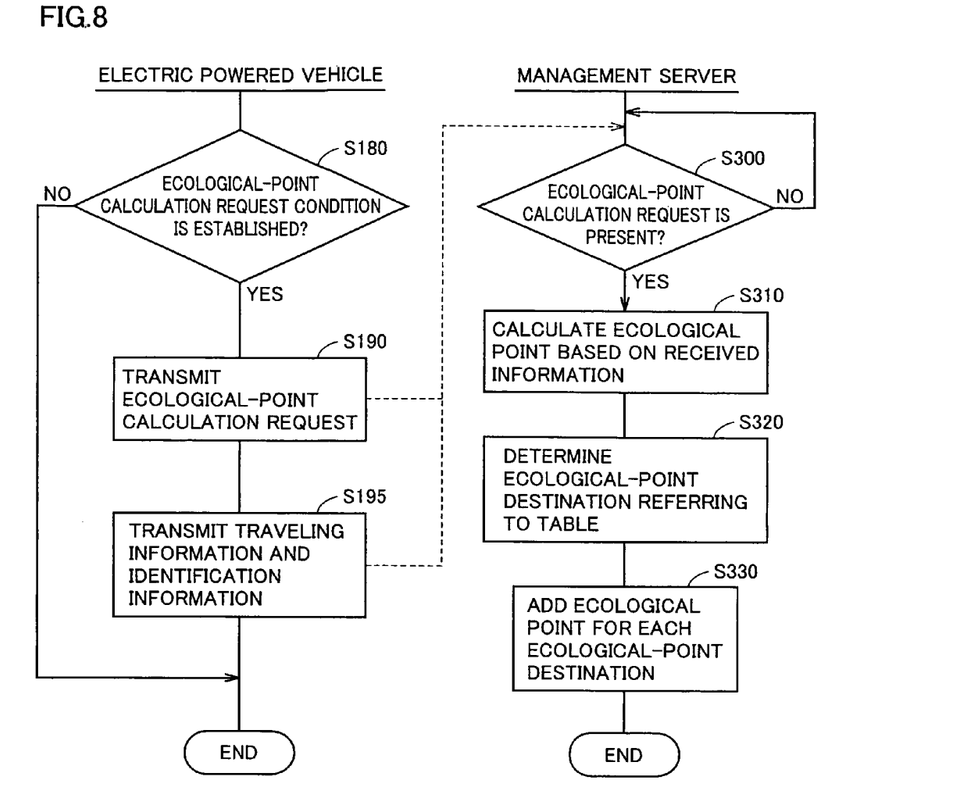
FIG. 8 is a flowchart showing a second example of the series of processing steps of creation of the ecological-point calculation request, ecological-point calculation and transmission in the ecological-point management system according to the present embodiment.

Next, referring to FIGS. 7 and 8, a series of processing of creation of a calculation request of the ecological point, ecological-point calculation, sending, and management in the ecological-point management system according to the present embodiment is described.

In FIG. 7, processing steps when an ecological-point calculation request is created at the time of external charge by charging facility 300 are shown as a first example.

Referring to FIG. 7, the electric powered vehicle transmits an external charge request (step S100). The transmission of the external charge request is automatically created, for example, by electrically connecting between electric powered vehicle 200 and charging facility 300 through feeder cable 305. Furthermore, the electric powered vehicle transmits the identification information of electric powered vehicle 200 (step S110). At this time, ecological-point information IEP described in FIGS. 4 and 5 may be transmitted together.

Electric facility 300 continuously determines the presence or absence of creation of an external charge request from electric powered vehicle 200 (step S200). If there is an external charge request from electric powered vehicle 200 in step S100 (when YES is determined in S200), in electric facility 300, the processing is advanced to step S210, and authentication of whether or not the external charge of electric powered vehicle 200 by charging facility 300 is enabled or disabled is performed, using the identification information transmitted from electric powered vehicle 200 in step S110.

This authentication needs to allow at least electric powered vehicle 200 to be specified. Alternatively, in charging facility 300 planned to be shared with only specific members in advance, such as charging facility 300 provided in a parking area of collective housing, authentication of whether or not electric powered vehicle 200 falls into the above-described members registered in advance may be further performed.

In charging facility 300, if the authentication result is OK (when YES is determined in S210), electric power supply for external charge is started (step S220). On the other hand, if the authentication result is NG (when No is determined in S210), subsequent processing is non-executed, and thus, the external charge by charging facility 300 is not executed.

In electric powered vehicle 200, if the authentication result is OK (when YES is determined in S120), the charge of electric storage device 216 by the external electric power source is started (step S130). During the external charge of electric storage device 216, whether or not the charge of electric storage device 216 has been completed is determined based on SOC (State of Charge) of electric storage device 216 and the like (step S140). In step S140, the charge of electric storage device 216 by the external electric power source is continuously executed until it is determined that the charge of electric storage device 216 has been completed (when NO is determined in S140). On the other hand, if the authentication result is NG (when NO is determined in S120), subsequent processing is non-executed, and thus, the external charge of electric storage device 216 is not executed.

If the charge of electric storage device 216 has been completed (when YES is determined in S140), electric powered vehicle 200 notifies charging facility 300 of the charge completion (step S150), and further, a calculation request of the ecological point is created and transmitted (step S160). Ecological-point information IEP may be transmitted together with the calculation request of the ecological point.

Furthermore, in electric powered vehicle 200, external-charge completion processing is executed (step S170). This allows, for example, internal operation such as relay release and the like for shutting off the electric path of the external charge to be executed.

In charging facility 300, after the electric power supply for external charge is started, whether or not the charge completion is notified from electric powered vehicle 200 is determined (step S230). The electric power supply for external charge (step S220) is continuously executed until the charge completion is notified from electric powered vehicle 200 (while NO is being determined in step S230).

If the charge completion is notified from electric powered vehicle 200 (when YES is determined in step S230), the electric power supply for external charge is stopped, and further an ecological-point calculation request is transmitted from charging facility 300 to management server 410 (step S240). The creation of the ecological-point calculation request shown in step S160 may be executed collectively in step S240. That is, the creation of the ecological-point calculation request may be performed in either electric powered vehicle 200 or charging facility 300.

Identification information ID of electric powered vehicle 200 and charging facility 300, and ecological-point information IEP are transmitted from charging facility 300 to management server 410 (step S250).

In management server 410, whether or not the ecological-point calculation request is created is monitored (step S300). If the calculation request of the ecological point is created (YES is determined in S300), management server 410 calculates the ecological point based on the received ecological point information IEP (step S310), and further, referring to table 715 shown in FIG. 6, ecological-point destinations, that is, point recipients 420 are determined based on the identification information (step S320). That is, the processing in step S310 corresponds to a function of ecological-point calculation unit 700 shown in FIG. 6, and the processing in step S320 corresponds to a function of ecological-point destination determining unit 710 shown in FIG. 6.

Furthermore, management sever 410 updates the stored data in point storage unit 730 shown in FIG. 6 so that the calculated ecological point are added for point recipients 420 that are determined to be destinations of the ecological point (step S330).

By the above-described series of processing, a system that automatically creates the calculation request of the ecological point at the time of external charge by charging facility 300, and executes the calculation, giving, and management of the ecological point is realized.

On the other hand, FIG. 8 shows, as a second example, processing steps in a case where a calculation request of the ecological point is created by electric powered vehicle 200 at timing different from that in the external charge.

Referring to FIG. 8, in electric powered vehicle 200, whether or not an ecological-point calculation request condition is established is sequentially determined (step S180). As described above, the ecological-point calculation request condition is established, for example, in response to manual operation of operation unit 255, driving end of electric powered vehicle 200 (ignition switch or power switch is turned off), lapse of a predetermined time, traveling a predetermined distance, and feeding into fuel tank 22. If the ecological-point calculation request condition is established (when YES is determined in S180), in electric powered vehicle 200, an ecological-point calculation request is transmitted (step S190), and further, identification information ID and ecological-point information IEP are transmitted (step S195). Here, in the processing steps of FIG. 8, at the time of external charge by charging facility 300, the identification for specifying charging facility 300 needs to be stored inside electric powered vehicle 200, and be transmitted to management server in step S195.

In steps S300 to S330 similar to those in FIG. 7, management server 410 calculates the ecological point in response to an ecological-point calculation request created automatically or by manual operation in electric powered vehicle 200, and in addition, determines ecological-point destinations and updates stored contents of point storage unit 730 of each of point recipients 420 to which the ecological point is sent.

The above-described series of processing realizes the system that executes the calculation, giving and management of the ecological point even if the configuration is employed, in which the ecological-point calculation request is created from electric powered vehicle 200 side at the different timing from that of the external charge.

Flowcharts of FIGS. 7 and 8 illustrate the processing steps in the system configuration in which the calculation, giving and management of the ecological point are executed by management server 410, that is, the ecological point is centrally managed by management server 410. However, in the case where the functions of management server 410 are decentrally arranged, a part or all of steps S300 to S330 may be processing steps that are executed by an arithmetic operating device such as a computer installed in another system component.

Moreover, while the calculation and giving of the ecological point are described as a series of operation, only the calculation of the ecological point (trial calculation) may be enabled to be requested.

As described above, according to the ecological-point management system of the present embodiment, not only the owner and the driver of the electric powered vehicle but also the provider of the infrastructure for external charge or the cooperator can be given the ecological point in accordance with the amount of greenhouse gas ($CO_2$) emission reduced by electric power traveling by electric powered vehicle 200.

As a result, the motivation for reduction in greenhouse gas emission by the popularization and expanded use of the electric powered vehicle can be widely yielded in the whole society.

Furthermore, the operation in which each of point recipients 420 can gain direct benefit in accordance with the given ecological point allows the motivation to be further increased. As described above, the system can be operated such that individual point recipient 420 such as the owner and the driver of electric powered vehicle 200 can use the ecological point as electronic money in service facility 510 (FIG. 1), a parking area thereof and the like, or can use the ecological point by converting it to a point for receiving a predetermined privilege (fee discount, upgrading or the like), or another point for mileage service or the like.

Alternatively, a tax deduction of automobile tax, gasoline tax or the like may be received or a discount of an electric power charge may be received via an electric power company in accordance with the ecological point. Moreover, the operation may be employed in which a toll fare of toll road is paid or a discount thereof is provided in accordance with the ecological point.

Moreover, by the operation in which for a business enterprise such as an electric power company, or point recipient 420 that is a business, the ecological point can be reflected in reduction in tax such as automobile tax and corporate tax, or can be counted as reduction in amount of in greenhouse gas ($CO_2$) emission or RPS (Renewable Portfolio Standard) investment amount, the increased motivation can be expected.

Alternatively, the operation can be such that trading or encashment of ecological point itself is enabled, or such that a discount or a subsidy at the time of purchase of electric powered vehicle 200 or at the time of payment of automobile insurance can be provided. Furthermore, a discount of electricity charges in accordance with ecological point, or a discount by a discount contract exclusively for external charge may be realized by an electric power company.

In this manner, according to the ecological-point management system of the present embodiment, the motivation to acquire the ecological point by which reduction in greenhouse gas emission is quantitatively evaluated can be expected to be widely spread, and thus, the effect of reduction in greenhouse gas emission through the popularization and the expanded used of electric powered vehicle 200 can be expected to be enhanced in the whole society.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An ecological-point management system for operating a point given in accordance with an amount of greenhouse gas emission that can be reduced by traveling using electric power by an electric powered vehicle configured to be chargeable by a charging facility outside said electric powered vehicle, comprising:

a transmission unit for transmitting calculation information including at least one of information of traveling using electric power from an electric storage device mounted on said electric powered vehicle, and information of charge of said electric storage device by said charging facility together with identification information of said electric powered vehicle and said charging facility that charges said electric storage device;

a point calculation unit calculating an ecological point to be given, based on said calculation information transmitted from said transmission unit;

a management unit giving said ecological point calculated by said point calculation unit to a point destination associated with said electric powered vehicle and a point destination associated with said charging facility, based on said identification information transmitted from said transmission unit;

storage units provided on said point destinations and storing said ecological point given by said management unit; and at least one processor programmed to implement at least one of the transmission unit, the point calculation unit, the management unit and the storage units.

2. The ecological-point management system according to claim 1, wherein said point destination is associated with an owner of said electric powered vehicle.

3. The ecological-point management system according to claim 1, wherein said point destination is associated with an electric power supplier to said charging facility.

4. The ecological-point management system according to claim 1, wherein said point destination is associated with at least one of a manufacturer, an installation personnel, and an owner of said charging facility.

5. The ecological-point management system according to claim 1, wherein said point destination is associated with an owner of an installation place of said charging facility.

6. The ecological-point management system according to claim 1, further comprising a request unit generating a calculation request of said ecological point, wherein said transmission unit transmits said calculation information and said identification information to said point calculation unit in response to said calculation request.

7. The ecological-point management system according to claim 6, wherein said request unit automatically generates said calculation request when driving of said electric powered vehicle ends.

8. The ecological-point management system according to claim 6, wherein said request unit automatically generates said calculation request in response to a lapse of a predetermined time.

9. The ecological-point management system according to claim 6, further comprising an input unit receiving said calculation request operated manually, wherein said request unit generates said calculation request in response to operation of said input unit.

10. The ecological-point management system according to claim 6, wherein said request unit automatically generates said calculation request at the time of charge of said electric storage device by said charging facility.

11. The ecological-point management system according to claim 1, wherein said point calculation unit calculates said ecological point with reflecting an amount of charging power at the time of charge of said electric storage device by said charging facility.

12. The ecological-point management system according to claim 1, wherein said point calculation unit calculates said ecological point with reflecting information of charging power of said electric storage device by said charging facility.

13. The ecological-point management system according to claim 1, wherein said point destination is associated with both an owner of said electric powered vehicle and a person involved in said charging facility.

14. The ecological-point management system according to claim 13, wherein said point destination is associated with an electric power supplier to said charging facility.

15. The ecological-point management system according to claim 13, wherein said point destination is associated with at least one of a manufacturer, an installation personnel, and an owner of said charging facility.

16. The ecological-point management system according to claim 13, wherein said point destination is associated with an owner of an installation place of said charging facility.

* * * * *